United States Patent [19]

White et al.

[11] Patent Number: 4,924,703

[45] Date of Patent: May 15, 1990

[54] TANK-LEVEL ALARM CONTROL SYSTEM

[75] Inventors: John J. White, Wilmette; Robert H. Dean, Evanston, both of Ill.

[73] Assignee: Midland Manufacturing Corp., Skokie, Ill.

[21] Appl. No.: 348,044

[22] Filed: May 5, 1989

[51] Int. Cl.$^5$ .................... G01F 23/62; H01H 35/18
[52] U.S. Cl. ................... 73/308; 73/DIG. 5; 200/84 C; 340/624
[58] Field of Search .............. 73/306, 322, 308, 313; 200/84 C; 340/624

[56] References Cited

U.S. PATENT DOCUMENTS

| | | | |
|---|---|---|---|
| 3,815,416 | 6/1974 | Portis | 73/DIG. 5 X |
| 3,942,526 | 3/1976 | Wilder et al. | 200/84 C X |
| 3,993,941 | 11/1976 | McGoldrick | 73/DIG. 5 |
| 4,142,079 | 2/1979 | Bachman | 340/624 X |
| 4,321,590 | 3/1982 | Ishikawa et al. | 340/624 X |
| 4,480,469 | 11/1984 | Tice | 73/DIG. 5 |

Primary Examiner—Daniel M. Yasich
Attorney, Agent, or Firm—Emrich & Dithmar

[57] ABSTRACT

The gauge has an outer tube sealed at its lower end and adapted for attachment to the top wall of the tank. The gauge also has an inner tube axially movable within the outer tube. A float encircles the outer tube. Magnets respectively attach to the float and to the lower end of the inner tube, whereby a rising liquid causes the inner tube to rise as well. When the liquid level reaches a predetermined high level, a pencil-type magnet mounted within the inner tube operates a switch in an alarm box mounted in the top of the outer tube.

7 Claims, 3 Drawing Sheets

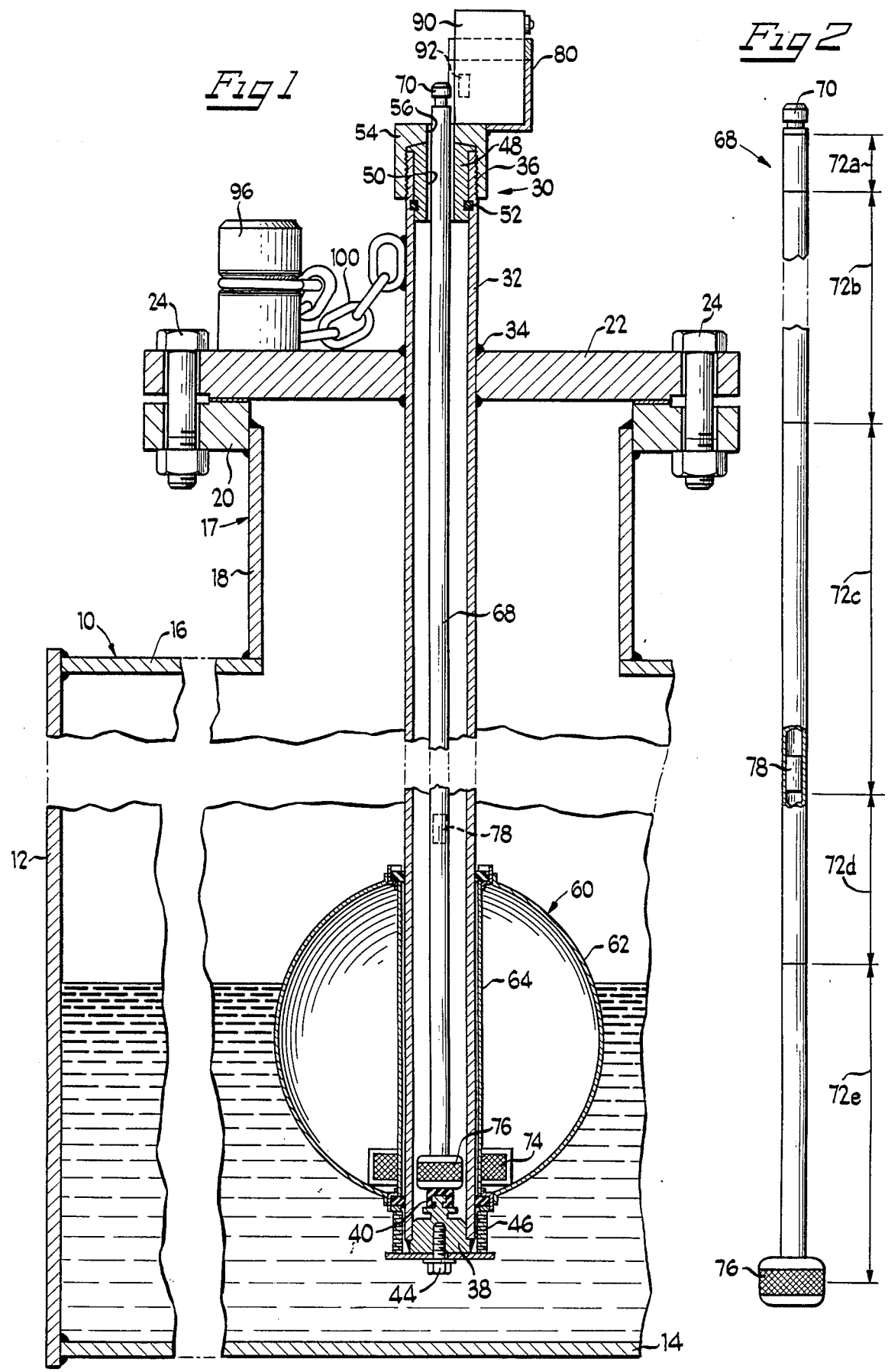

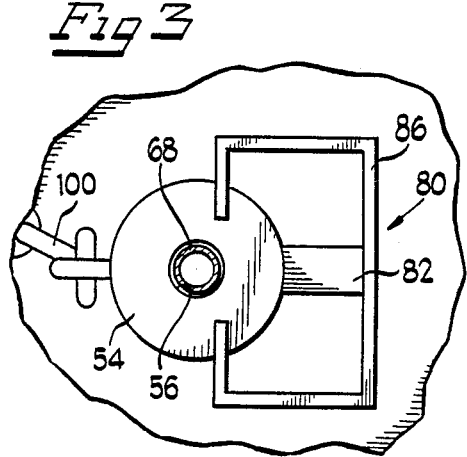
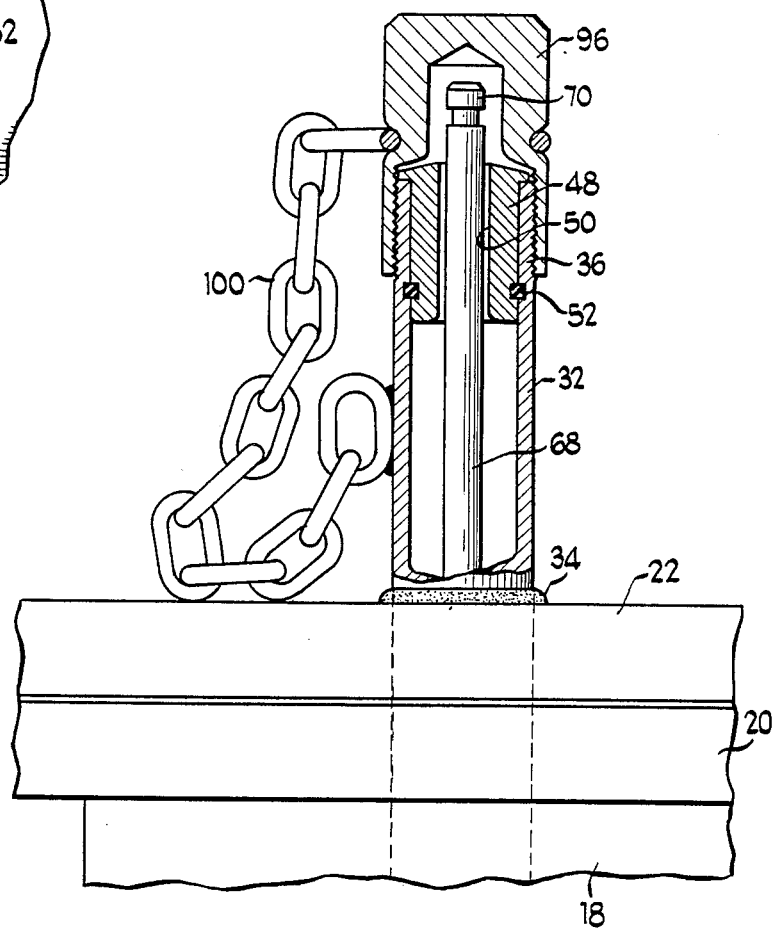
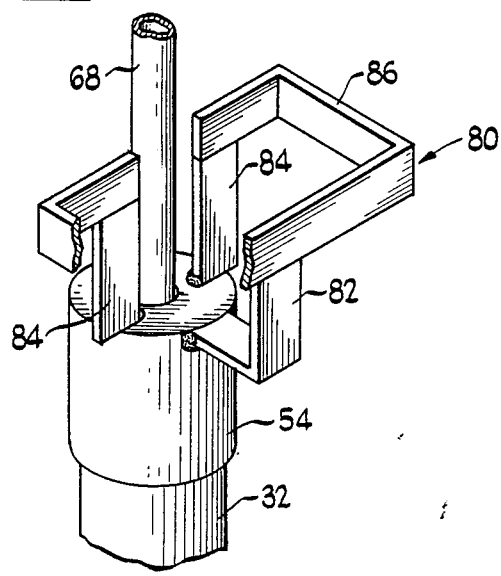

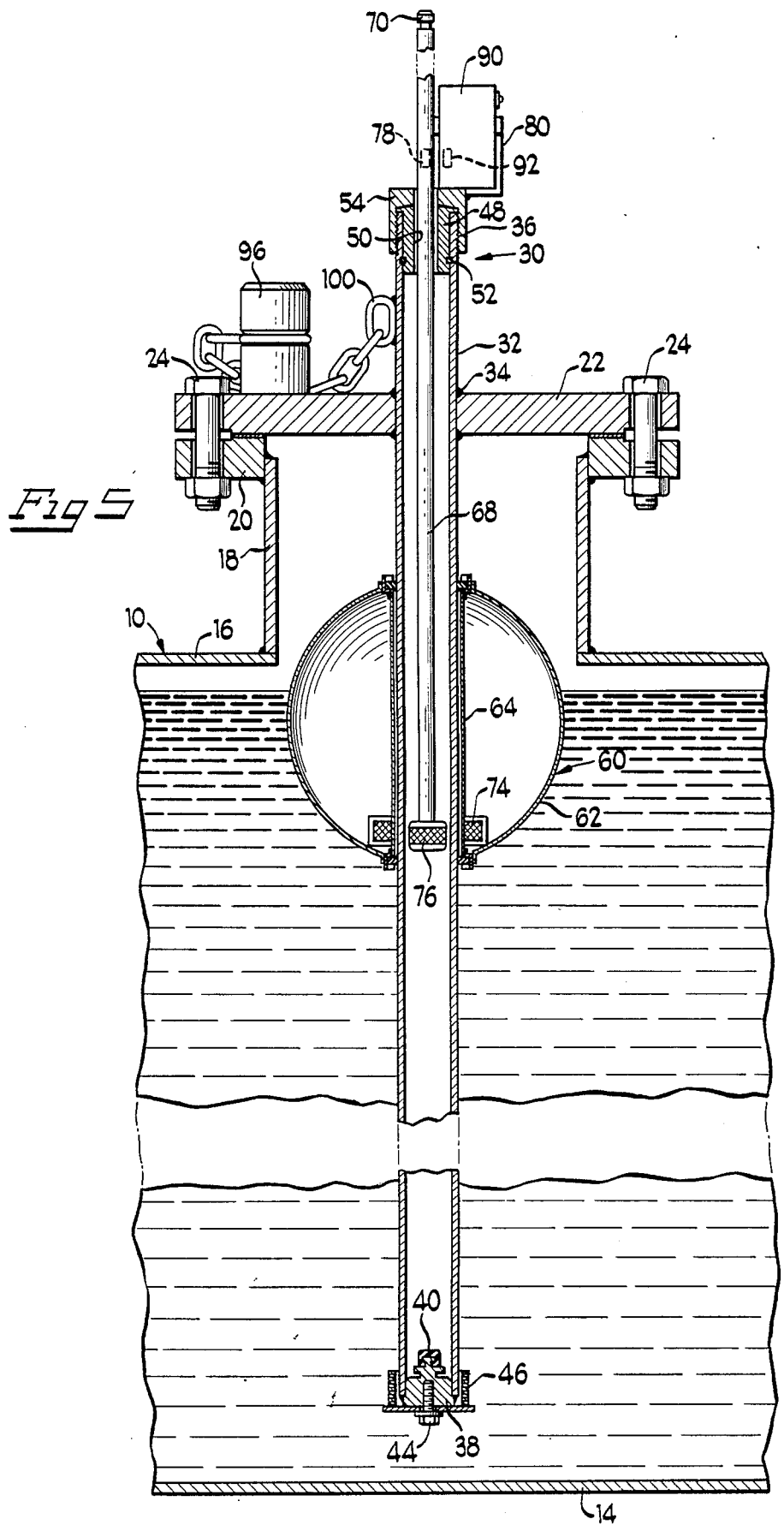

TANK-LEVEL ALARM CONTROL SYSTEM

BACKGROUND OF THE INVENTION

U.S. Pat. No. 3,815,416, assigned to the assignee of this patent application, discloses a prior art apparatus for indicating the level of liquid in a tank. The patented apparatus comprises a float encircling a tube extending down into the tank. The float is magnetically coupled to a gauging rod which bears indicia representing the level of liquid in the tank. As the liquid level rises, the float carries the rod upwardly. The tankerman is apprised of the level in the tank by the visible indicia of the rod. The patented apparatus also has a mechanism for automatically visually and audibly alerting the tankerman when the level has reached a particular level, such as near full. This mechanism includes a tower and a series of reed switches mounted on the tank above the rod opening. A magnet attached to the top of the rod would come into close proximity to the reed switches to serially actuate them as the tank is becoming filled.

While this system performs quite well, the tower is undesirable because it adds expense to the apparatus, is more dangerous and is cumbersome.

SUMMARY OF THE INVENTION

It is therefore an important object of the present invention to provide an improved tank-level gauge which does not incorporate a tower.

Another object is to provide an improved tank-level gauge that utilizes magnetic interconnection between the float and the rod and between the rod and a reed switch alarm.

In summary, there is provided a tank-level gauge for use in indicating the level of liquid in a tank, comprising an outer tube having a lower end for extending into the tank and an upper end for protruding from the tank, a float encircling the outer tube, whereby a rising level of liquid in the tank would cause the float to rise, an inner tube disposed inside the outer tube and axially movable therein and having lower and upper ends, first magnet means attached to the inner tube adjacent to the lower end thereof, second magnet means in the float generally of donut shape and encircling the outer tube and being adapted to magnetically couple to the first magnet means, whereby a rising level of liquid in the tank would cause the inner tube to rise, magnetically operable switch means laterally adjacent to the inner tube near the upper end of the outer tube, and third magnet means mounted within the inner tube and being adapted to magnetically operate the switch means when adjacent thereto.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts a fragmentary portion of a tank in which is mounted a tank-level gauge depicted in vertical section and constructed according to the features of the present invention;

FIG. 2 is a fragmentary elevational view of the inner tube which forms a part of the tank-level gauge;

FIG. 3 is a top plan view of the tank-level gauge;

FIG. 4 is a perspective view depicting a fragmentary portion of the control box frame in the tank-level apparatus;

FIG. 5 is a view like FIG. 4, but on a smaller scale and with the float in its elevated position; and FIG. 6 is a sectional view of the upper portion of the tank-level gauge with a storage cap in place.

DETAILED DESCRIPTION OF THE PREFERRED EMBODIMENT

Turning now to the drawings, and more particularly to FIG. 1 thereof, there is depicted a tank 10 which is shown in fragmentary portion. Although the invention has use in providing information on the level of liquid in any kind of tank, it has particular use in barge tanks which may be from ten to thirty feet in height and thirty or more feet in length and/or width. The tank 10 has side walls 12, a bottom wall 14 and a top wall 16. The top wall 16 has an opening therein with which a nozzle 17 is aligned. The nozzle extends upwardly from the top wall 16 and includes a cylinder 18 welded thereto. A ring-shaped flange 20 is welded to the top of the cylinder 18 and a mounting plate 22 is attached to such flange by bolts 24 (only two of which are shown).

At the dock, the level of liquid in the tank 10 may be determined and, for that purpose, there is provided the gauge 30 incorporating the features of the present invention.

The gauge 30 comprises an outer tube 32 which preferably is composed of corrosion-resistant, non-magnetic material in order to withstand corrosive liquids if they are stored in the tank 10. Stainless steel in the 300 series may be utilized. The tube 32 extends through an opening in the plate 22 and is attached thereto as by welding 34. The tube 32 has an upper end 36, the outside of which is threaded. A sealing plug 38 is seal welded on the lower end of the outer tube 32 and carries a rubber bumper 40. A washer 42 is attached to the plug 38 by means of a bolt 44. The outer diameter of the washer 42 is greater than the outer diameter of the outer tube 32, thereby defining a ledge upon which rests a spring defining a cushion 46.

A bushing 48 is disposed in the threaded end 36 of the outer tube 32 and has a bore 50 extending therethrough. The bushing has a circumferential groove within which resides an O-ring 52 to hold the bushing to the inside of the outer tube 32.

The gauge 30 further comprises a bracket holder 54 with a threaded interior to mate with the threaded upper end 36 of the outer tube 32. The bracket holder 54 has a hole 56 therethrough which is aligned with the bore 50 in the bushing 48.

The gauge 30 comprises a float 60 having a hollow spherical shell 62 and a tube 64 hermetically attached together. The tube 32 passes through the tube 64 so that the float 60 can freely move with change in liquid level. The float is also preferably made of corrosion-resistant, non-magnetic material.

The gauge 30 further comprises an inner tube 68 which resides in the outer tube 32 and is axially movable therein. The tube 68 is preferably made of light-weight material such as aluminum. The inner tube 68 extends through the bore 50 in the bushing 48 and the hole 56 in the bracket holder 54. In the upper end of the inner tube 68 is a tip 70 which protrudes upwardly therefrom.

Within the float 60 is mounted a ring-shaped magnet 74 which is attached to the inside wall of the shell 62 and encircles the tube 64. Thus, as the float 60 rises, the magnet 74 carried thereby also rises.

Referring to FIG. 2, the exterior of the inner tube 68 may bear numbers representing liquid height and also may be divided into four different zones 72a–d, respectively colored according to a standard scheme, namely, orange, green, yellow and red. A fifth zone 72e may be uncolored. The tube may bear a transparent plastic sleeve to protect the numbers and colors. In an actual embodiment of the invention, the zone 72a was 1" in length, the zones 72b and 72c were 17.25" and the zone 72d was 8" in length. The distance from the bottom of the zone 72d to the magnet 76 was 15.5". These colored indicia and numbers appear as the tube 68 rises through the bushing 48.

Residing in the inner tube 68 is a magnet 78 which is frictionally held in place. The magnet 78 is located nearer the bottom of the inner tube 68 than the top, at the bottom of the zone 72c. Attached to the lower end of the inner tube 68 is a cylindrical magnet 76 having a height generally corresponding to the height of the magnet 74.

The gauge 30 comprises a bracket 80, which may be defined by an L-shaped member 82 and two strips 84 welded to the bracket holder 54. The bracket 80 also includes a C-shaped member 86 welded to the upper ends of the member 82 and the strips. Positioned within the bracket 80 is a control box 90 having visual and/or audible annunciators (not shown) to create alerting flashes and tones. It is understood that the depicted construction of the holder 54 and the bracket 80 is exemplary. Other ways to mount the box 90 would be equally acceptable. The box 90 contains a magnetically operable switch such as a reed switch 92 located laterally adjacent to the outer tube 32. The control box 90 also contains circuitry (not shown) coupling the reed switch 92 to the annunciators contained in the box 90. The magnet 78 is preferably positioned within the inner tube so that it will be laterally aligned with the reed switch 92 when the "red" zone 72d is visible. Alternately, the box 90 may house just the reed switch 92, which is electrically connected to another circuit, remotely located, containing, for example, relays, annunciators, etc.

When the tank 10 is empty, or at least at the level depicted in FIG. 1 or below, the float 60 is located at the bottom of the outer tube 32 and rests upon the cushion 46. The tip 70 of the inner tube is visible to the tankerman. As the liquid in the tank 10 rises, the float 60 also rises carrying the magnet 74 mounted therein upwardly. The inner tube 68 also rises because of the magnetic coupling between the two magnets 74 and 76. Initially, the zone 72a, typically orange, will be visible to the tankerman. As the liquid level rises, the zone 72b, typically green, will become visible. As the level continues to rise, the level 72c, typically yellow, will become visible and at its end the magnet 78 becomes aligned with the reed switch 92, thereby setting off the visual and/or audible annunciators, informing the tankerman that the tank is full or near full. This condition is depicted in FIG. 5. If the level continues to rise, the zone 72d, typically red, becomes visible, signifying danger. Then, the float 60 will be near its highest position and the tank nearly full.

After making the determination of the liquid level, the inner tube 68 can be moved out of the way by simply pressing on the tip 70 to cause disengagement of the magnets 74 and 76. The inner tube 68 will drop to its stored position on the bumper 40, but is so dimensioned that a short section (for example one inch in length) will still protrude at the upper end of the outer tube 32.

The magnets 74 and 76 are so arranged that when the tank 10 is empty, the magnet 74 in the float 60 will be below or even with the magnet 76 on the lower end of the tube 68, so that when liquid enters the tank 10 the float automatically rises when the cap 96 is removed.

Measurements of the level of liquid in the tank are made infrequently. Therefore, referring to FIG. 6, a protective cap 96 is provided to close the outer tube 32. The cap 96 has a cavity 98 within which the tip 70 resides. The cap is tethered by a chain 100. When the tank 10 is not being gauged, bracket holder 54 is replaced by the cap 96, thereby closing the outer tube 32.

What has been described therefor is an improved gauge which enables the tankerman to monitor the level of liquid in the tank and alerts him to the tank being nearly filled by visual and/or audible signals. The gauge system does not incorporate any tower structure.

What is claimed is:

1. Tank-level gauge for use in indicating the level of liquid in a tank, comprising an outer tube having a lower end for extending into the tank and an upper end for protruding from the tank, a float encircling said outer tube, whereby a rising level of liquid in the tank would cause said float to rise, an inner tube disposed inside the outer tube and axially movable therein and having lower and upper ends, first magnet means attached to said inner tube adjacent to the lower end thereof, second magnet means in said float generally of ring shape and encircling said outer tube and being adapted to magnetically couple to said first magnet means, whereby a rising level of liquid in the tank would cause said inner tube to rise, magnetically operable switch means laterally adjacent to said inner tube near said upper end of said outer tube, and third magnet means mounted within said inner tube and being adapted to magnetically operate said switch means when adjacent thereto.

2. The tank-level gauge of claim 1 and further comprising a bushing in said outer tube in the upper end thereof, said bushing slidingly receiving said inner tube.

3. The tank-level gauge of claim 1 and further comprising a cap removably attached to said outer tube at the upper end thereof.

4. The tank-level gauge of claim 1 and further comprising a frame adjacent to said outer tube near the upper end thereof and attached thereto, an alarm box mounted in said frame, said magnetically operable switch being disposed within said alarm box.

5. The tank-level gauge of claim 1, wherein said inner and outer tubes are coaxial.

6. The tank-level gauge of claim 1, wherein said first magnet means is located in said inner tube at the lower end thereof.

7. The tank-level gauge of claim 1, wherein said third magnet means is located nearer the lower end of said inner tube than the upper end thereof.

* * * * *